United States Patent
Money

[11] Patent Number: 5,117,850
[45] Date of Patent: Jun. 2, 1992

[54] DEVICE FOR SURFACE TREATING OF METAL PARTS

[75] Inventor: Louis W. Money, Kalamazoo, Mich.

[73] Assignee: Delrod Sales Corporation, Kalamazoo, Mich.

[21] Appl. No.: 691,636

[22] Filed: Apr. 25, 1991

[51] Int. Cl.⁵ .............................................. B08B 3/02
[52] U.S. Cl. ..................... 134/63; 51/163.2; 134/118; 134/132; 134/133
[58] Field of Search ................... 134/61, 63, 117, 118, 134/132, 133, 140, 151, 157, 161; 51/163.1, 163.2

[56] References Cited

U.S. PATENT DOCUMENTS

| | | | |
|---|---|---|---|
| 3,687,264 | 8/1972 | Jackson | 134/132 X |
| 3,906,679 | 9/1975 | Riedel | 51/163.2 |
| 4,329,817 | 5/1982 | Balz | 51/163.2 |
| 4,408,417 | 10/1983 | Kobayashi et al. | 51/163.2 |
| 4,461,122 | 7/1984 | Balz | 51/163.2 |
| 4,905,416 | 3/1990 | Hurley | 51/163.2 X |

FOREIGN PATENT DOCUMENTS 0004351 1/1983 Japan .................. 51/163.1

*Primary Examiner*—Philip R. Coe
*Attorney, Agent, or Firm*—Flynn, Thiel, Boutell & Tanis

[57] ABSTRACT

The objects and purposes of the invention are met by providing a device for surface treating of metal parts which includes a frame, and annular basin mounted on the frame and adapted to hold a first treatment solution therein. An upwardly inclined track encircles the annular basin and a passageway is provided between the interior of the annular basin and an inlet end of the track. A gate is utilized to keep the metal parts within the annular basin when the gate is closed and to allow the metal parts to move on the track when the gate is open. At least one treatment station is provided along the length of the track with fluid delivery structure being provided for spraying a second treatment solution onto the metal parts as they move therepast. An eccentrically located weight is provided on a rotatable shaft in the central portion of the annular basin so that when the drive motor drives the shaft for rotation, the annular basin and the track will be subjected to an oscillatory vibration causing the parts to move in a circular path within the basin as well as up the track when the gate is in the open position.

9 Claims, 3 Drawing Sheets

DEVICE FOR SURFACE TREATING OF METAL PARTS

FIELD OF THE INVENTION

This invention relates to a washing and chemical treatment device and, more particularly, to a washing and chemical treatment device for surface treating of metal parts, the cleaning or chemical treatment solutions being continuously separated from the treated parts, the parts being automatically discharged upon the completion of a desired surface treatment.

BACKGROUND OF THE INVENTION

Small, bulk-handled metal parts have traditionally received surface treatments such as washing, phosphating, chromating and the like in submersed plating barrel equipment, in auger-feed drum machines, reversing-auger batch drum machines, or by use of individual devices for accomplishing each stage in a treatment process. An example is the film-forming operation on needle bearings, where the bearings, after appropriate radiusing and smoothing in oblique tumbling barrels are then cleaned in the barrel with an alkaline cleaner, rinsed. drained, tumbled in a film-forming solution, drained and removed to a heated cobmeal drying apparatus (often in another oblique barrel) where the bearings are dried. All of these stages can be done in one oblique barrel, but require several extra washings and rinses because of the soil build-up in the radiusing stage. Whether performed in one or several barrels, the process involves much hand labor for adding the various chemicals or cobmeal, the several rinses, and loading and unloading the bearings from the various barrels. Another example is phosphating small steel parts prior to painting. A horizontal cylinder, having an auger built inside, is fed parts at one end as it slowly turns on rollers. The parts are pushed by the auger toward the discharge end of the cylinder, while chemical solutions are flushed over them and out of the cylinder through perforations in the cylinder wall. As the parts move through different sections of the cylinder, they are sprayed with different solutions, such as cleaner solution, water rinse, phosphating solution, water rinse and sealer solution.

Campanelli Patent No. 4 002 488 illustrates one vibratory apparatus for purely chemical surface treatment, in this case washing of nails. The system involves several machines and only one chemical stage, that is, the wash stage. Further, this system is extremely large and is unsuitable for use in many applications.

Accordingly, it is an object of this invention to provide a device for surface treating of metal parts, which device is cylindrical in its overall construction and occupies a minimum of floor space.

It is a further object of this invention to provide a device for surface treating of metal parts, as aforesaid, wherein structure is provided for allowing the metal parts to remain within a basin, adapted to hold a treatment solution therein, for selected and variable time intervals before being advanced out of the basin through at least one subsequent treatment station.

It is a further object of this invention to provide a device for treating of metal parts, as aforesaid, which is of a durable construction and easy to maintain and service, should service be required.

SUMMARY OF THE INVENTION

The objects and purposes of the invention are met by providing a device for surface treating of metal parts which includes a base frame, and annular basin mounted on the frame and adapted to hold a first treatment solution therein. An upwardly inclined track encircles the annular basin and a passageway is provided between the interior of the annular basin and an inlet end of the track. A gate is utilized to keep the metal parts within the annular basin when the gate closes the passageway and to allow the metal parts to move on the track when the gate is open. At least one treatment station is provided along the length of the track with fluid delivery structure being provided for spraying a second treatment solution onto the metal parts as they move therepast. An eccentrically located weight is provided on a rotatable shaft in the central portion of the annular basin so that when the drive motor drives the shaft for rotation, the annular basin and the track will be subjected to an oscillatory vibration causing the parts to move in a circular path within the basin as well as up the track when the gate is in the open position.

BRIEF DESCRIPTION OF THE DRAWINGS

Other objects and purposes of this invention will be apparent to persons acquainted with apparatus of this general type upon reading the following specification and inspecting the accompanying drawings, in which.

DETAILED DESCRIPTION

Figure 1:
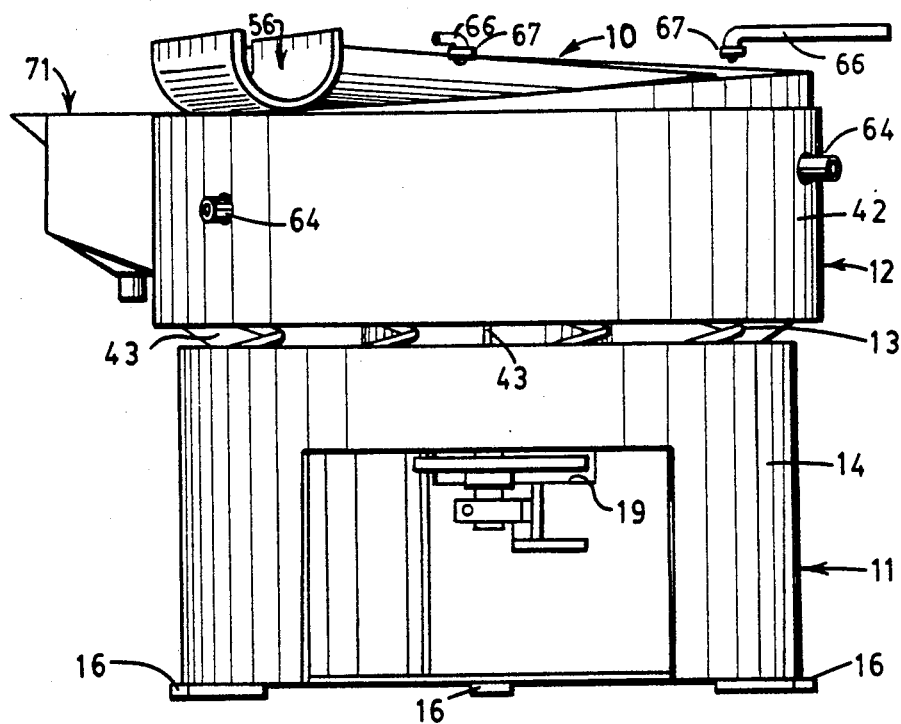
FIG. 1 is a side elevational view of the surface treating device embodying the invention.

Certain terminology will be used in the following description for convenience in reference only and will not be limiting. The words "up" and "down" will designate directions in the drawings to which reference is made. The words "in" and "out" will refer to directions toward and away from, respectively, the geometric center of the device and designated parts thereof. Such terminology will include derivatives and words of similar import.

Figure 3:
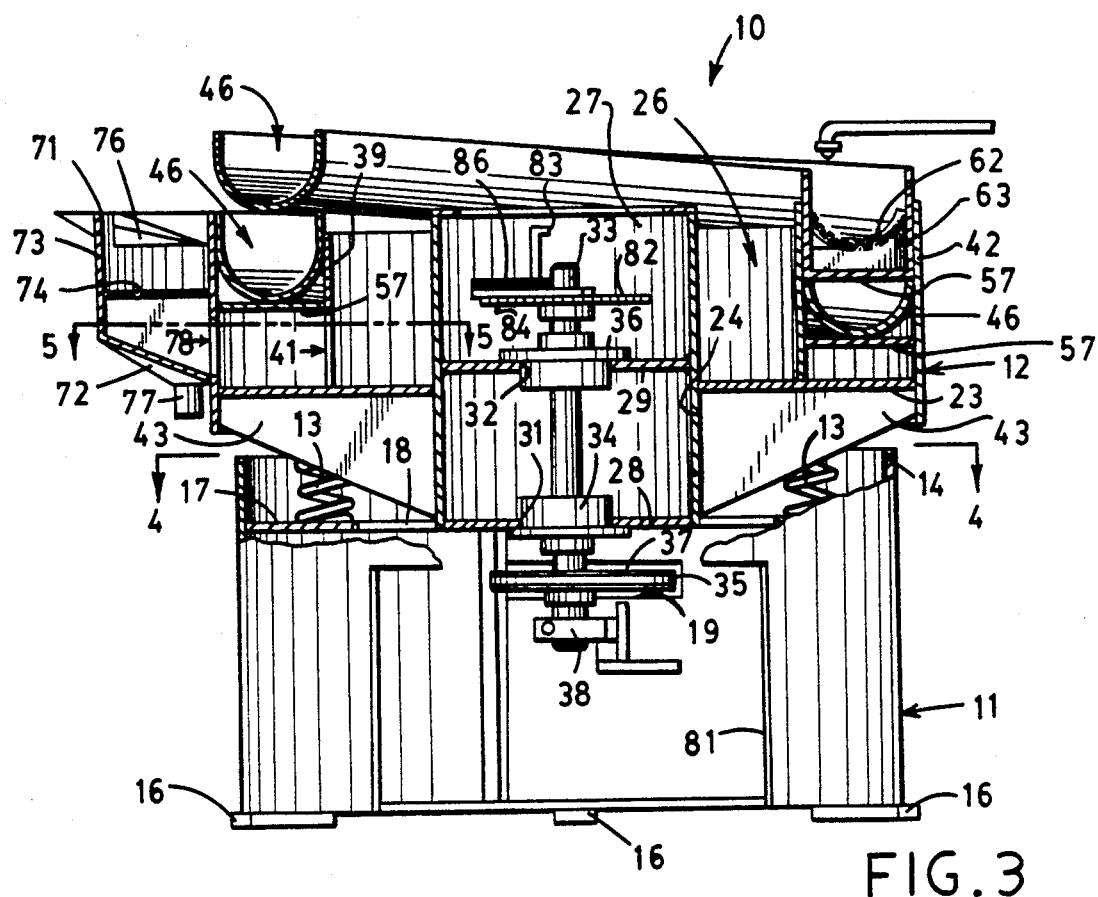
FIG. 3 is a sectional view taken along the line 3—3 of FIG. 2.
Figure 4:
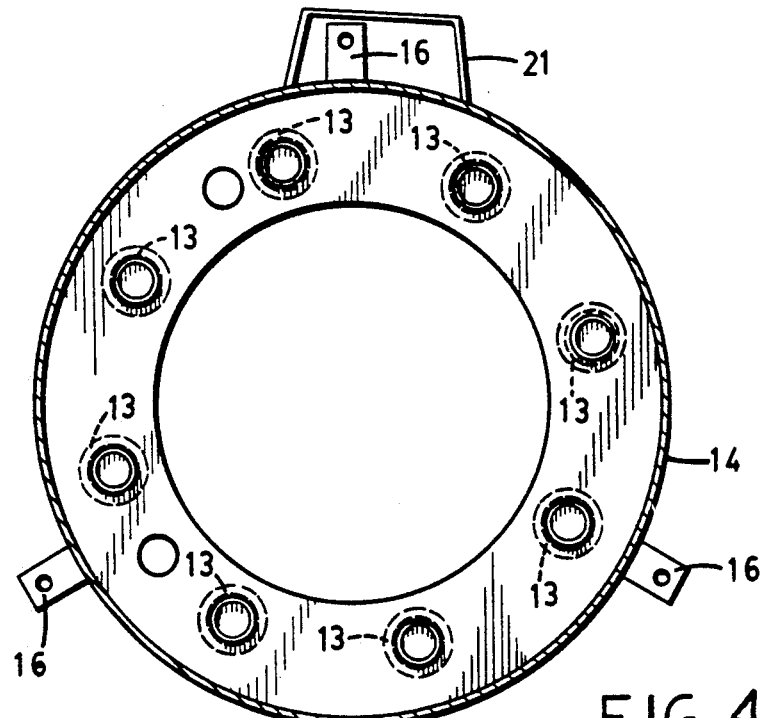
FIG. 4 is a sectional view taken along the line 4—4 of FIG. 3.

A device 10 for surface treating of small parts is illustrated in the drawings and includes a base frame 11 and a basin and upwardly inclined track section 12 resiliently mounted on the base frame 11 by plural coiled springs 13. More specifically, the base frame 11 includes a cylindrical wall construction 14 oriented about a vertically upright axis, which wall construction 14 has plural feet 16 provided along the bottom edge thereof. An annular horizontally aligned plate 17 is secured to the interior facing portion of the wall construction 14 as illustrated in FIG. 3. This securement can be by any conventional means, as by welding. The annular plate 17 includes a central hole 18 therein. The wall construction 14 has a rectangular shaped hole 19 therein as shown in FIGS. 1 and 3. A bracket 21 is secured to the exterior portion of the wall construction 14 and preferably immediately above or immediately below the hole 19. A motor 22, here an electric motor, is adapted to be mounted on the bracket 21 by any conventional means, as by bolts not shown. It is important that the rotatable shaft of the motor 22 be vertically aligned and oriented outside of and in radial alignment with the hole 19

A plurality of coiled springs 13 are mounted on the upwardly facing surface of the annular plate 17. Each annular spring 13 is fixedly secured to the annular plate by any convenient means not shown.

An annular plate 23 is mounted on the upper end of each of the springs 13. Further, each spring is fixedly secured to the underside of the annular plate 23 by any convenient means. A central hole 24 is provided in the annular plate 23.

The basin and track section 12 of the device 10 is the portion of the device that effects a surface treating of the parts. The basin and track section 12 includes an annular basin 26 having a bottom wall defined by the aforementioned annular plate 23 and an upstanding cylinder member 27 received in the central hole 24 of the annular plate 23 and whose central axis is coaxial with the central axis of the base frame 11. The annular plate 23 and the upstanding cylinder member 27 are secured by a liquid tight connection, as by welding. A plate 28 closes off the lower end of the upstanding cylinder member 27. A further plate 29 is secured to the interior of the upstanding cylinder member 27 midway of its length/height as shown in FIG. 3. Axially aligned holes 31 and 32 are provided centrally in the plates 28 and 29, respectively. A shaft 33 is rotatably supported in a pair of vertically spaced bearing assemblies 34 and 36 provided in the holes 31 and 32, respectively. The axis of rotation of the shaft 33 is, in this particular embodiment, congruent with the central axis of the upstanding cylinder member 27. A portion of the shaft 33 extends below the level of the plate 28 and includes a pulley 37 fixedly oriented thereon and a weight support bracket 38 also fixedly oriented thereon. An endless belt 35 engages the pulley 37 and effects a driving coupling of the pulley 37 to a corresponding pulley mounted on the output shaft of the motor 22.

Thus, the exterior surface of the upstanding cylinder member 27 above the annular plate 23 serves as the inner wall of the annular basin 26. A further upstanding cylinder member 39 is provided and encircles the upstanding cylinder member 27 and is further secured by any convenient means to the upper surface of the annular plate 23. In this particular embodiment, the connection between the lower edge of the upstanding cylinder member 39 and the annular plate 23 provides a fluid tight seal as does the connection between the exterior surface of the upstanding cylinder member 27 and the edge of the hole 24 in the annular plate 23. In this particular embodiment, the upstanding cylinder member 39 is oriented mid-width of the annular plate 23 as shown in FIG. 3. An opening 41 is provided in the wall of the upstanding cylinder member 39. The opening 41 extends from the upper surface of the annular plate 23 to approximately mid-height of the wall defined by the upstanding cylinder member 39 and over about 30° to 40° of the periphery of the member 39.

A further upstanding cylinder member 42 is secured to the radially outer edge of the annular plate 23. In this particular embodiment, a portion of the upstanding cylinder member 42 extends beneath the plane of the annular plate 23 a finite distance. A plurality of gussets 43 are fixedly connected to the underside of the annular plate 23, the radially outer surface of the upstanding cylinder member 27 and the portion of the inside surface of the upstanding cylinder member 42 extending beneath the annular plate 23. The gussets 43 serve the purpose of strengthening the annular plate 23.

An upwardly inclined spiral-like track 46 is provided in the space between the upstanding cylinder member 39 and the upstanding cylinder member 42. The inlet end of the track 46 is its lower end and is identified by the reference numeral 47 in FIG. 5. It will be noted that the inlet end 47 is immediately adjacent the opening 41 through the upstanding cylinder member 39 and flush with the upper surface of the annular plate 23. In this particular embodiment, the bottom wall of the track has an arcuate cross section.

Figure 5:
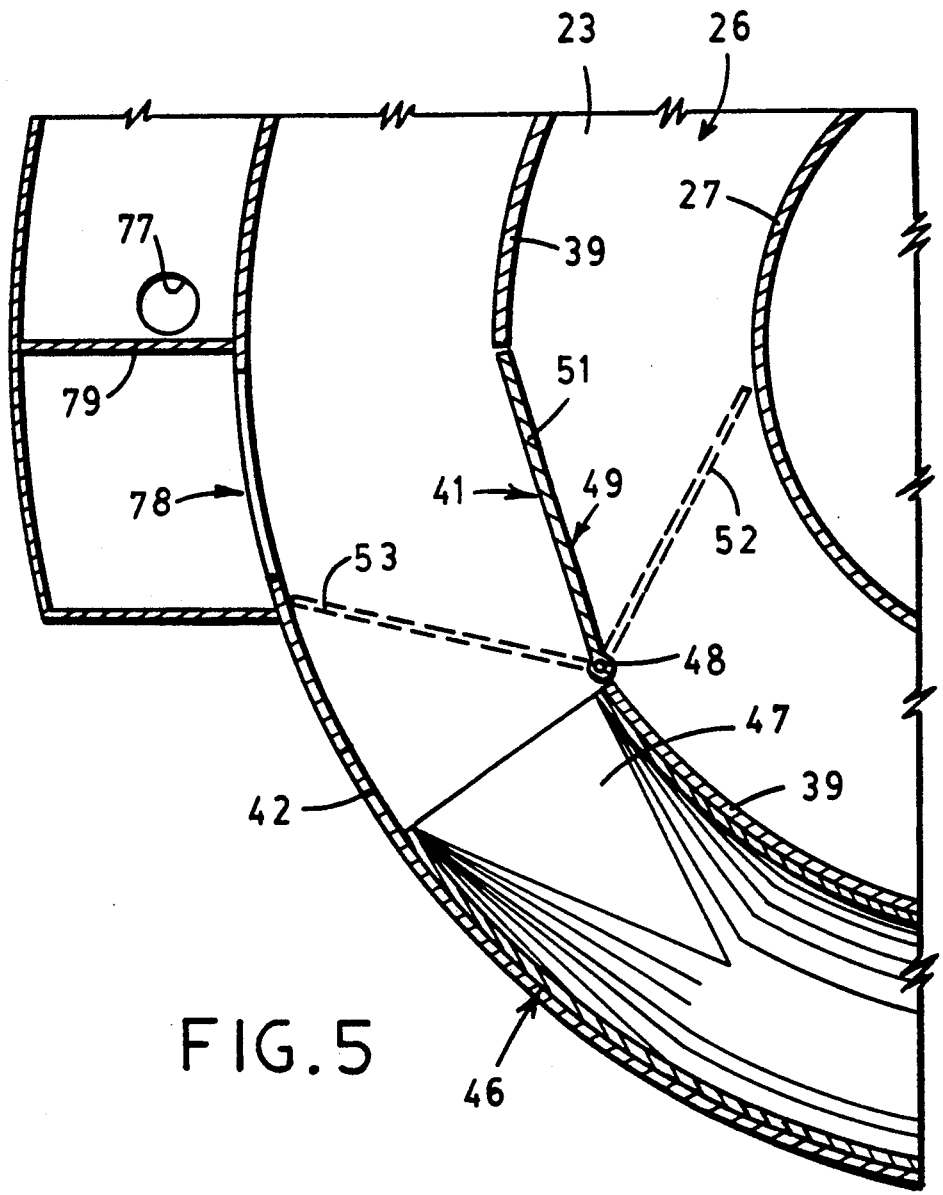
FIG. 5 is an enlarged sectional view taken along the line 5—5 of FIG. 3.

A vertically upstanding post 48 is provided adjacent the inlet end 47 of the track 46. In this particular embodiment, the post 48 is oriented in the arc of the circle defined by the upstanding cylinder member 39 and is oriented immediately adjacent the edge of the opening 41 closest to the inlet end 47 of the track 46. A gate 49 is movably mounted on the post 48. In this particular embodiment, the gate 49 includes a blade 51 whose length and height is sufficient to close the opening 41. As is illustrated in FIG. 5, the blade 51 is adapted to move about the axis of the post 48 between a first position 52 (illustrated in broken lines) blocking the space between the inner wall 27 and the outer wall 39 of the annular basin 26 and a second position 53 (illustrated in broken lines) blocking the space between the outer surface of the upstanding cylinder member 39 and the inner surface of the upstanding cylinder member 42 to block access to the inlet end 47 of the track 46. The blade 51 can be moved to the solid line position illustrated in FIG. 5 wherein it simply blocks or closes off the opening 41 between the annular basin 26 and the portion immediately radially outwardly thereof whereat is located the inlet end 47 of the track 46. If desired, a handle 54 can be secured to the upper end of the blade 51 adjacent the portion of the blade encircling the post 48 to facilitate movement of the blade 51 between its respective positions.

The upper end of the track 46 is its outlet end identified by the reference numeral 56.

If desired, the track 46 can be secured to the sidewardly facing walls of the upstanding cylinder members 39 and 42. On the other hand, an upwardly inclined, horizontally aligned annular strip 57 (FIG. 3) can be secured to the opposing walls of the upstanding cylinder members 39 and 42 with the track 46 resting on the upper surface of the strip 57. A further modification would be the provision of finite width brackets extending between the opposing surfaces of the upstanding cylinder members 39 and 42 with the annular track 46 resting on the brackets in the aforesaid upwardly inclined orientation.

Figure 2:
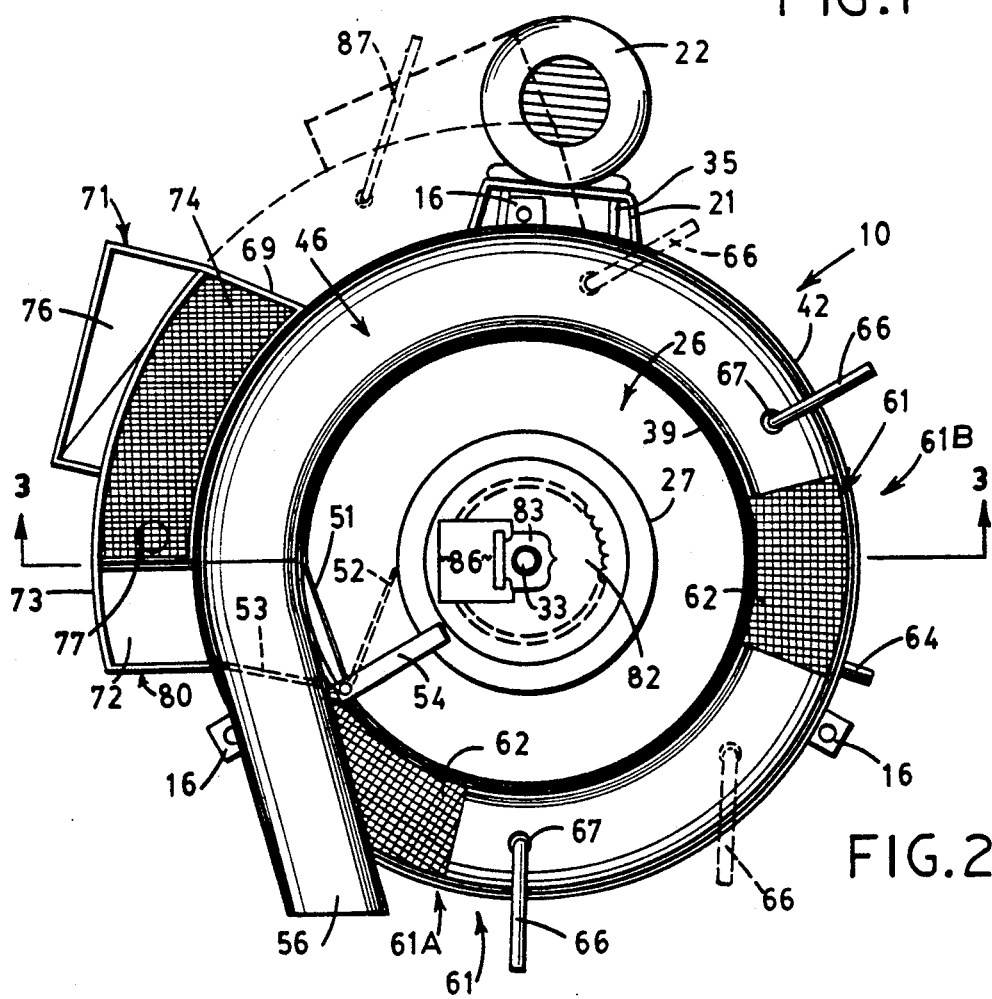
FIG. 2 is a top view thereof.

A plurality of treatment stations 61 are provided along the length of the track 46 as shown in FIG. 2. Each treatment station 61 includes a foraminous bottom wall section for the track 46, which foraminous bottom wall section extends a finite length of the track. Beneath the foraminous bottom wall there is provided a chamber 63 (FIG. 3) from which a drain pipe 64 extends. A fluid delivery device 66 is provided and includes a spray head 67 oriented over the center portion of the track 46 downstream (up the inclined track) from each of the foraminous bottom wall sections 62 as shown in FIG. 2.

A parts delivery structure is secured to the outside surface of the upstanding cylinder member 42 as illustrated in FIGS. 1, 2 and 3. The parts delivery structure 71 includes an upwardly inclined bottom wall 72 extending radially outwardly from the upstanding cylinder member 42 from a location approximately at the level of the annular plate 23. At the outboard edge of the bottom wall 72 there is provided an arcuate upstanding wall 73 secured to the bottom wall 72. A foraminous wall 74 extends between the inside surface of the upstanding wall 73 and the outer surface of the upstanding cylinder member 42 as well as between opposing end walls 69 and 79. An inlet chute 76 is provided on the wall 73 to allow parts to be introduced into the parts delivery structure 71 and onto the foraminous wall 74. In this particular embodiment, a drain pipe 77 is provided in the bottom wall 72 and is of a sufficient size to facilitate removal of any extraneous solid material, such as chips and others solids, and liquid that may be present on the parts as they are introduced into the parts delivery structure 71 and drop onto the bottom wall 72. The parts introduced into the parts delivery structure 71 are allowed to be introduced into the annular basin 26 through an outlet chute 80 and passageway 78 through the upstanding cylinder member 42 and thence through the space between the upstanding cylinder members 39 and 42 when the gate 49 or blade 51 is in the position illustrated at 53 in FIG. 5. It will also be noted that the upstanding wall 79 (FIG. 5) serves the purpose of preventing any fluid within the annular basin 26 from exiting the basin and flowing out through the drain pipe 77.

If desired, the parts delivery structure 71 can be lengthened as shown in broken lines in FIG. 2 to provide a longer track structure to facilitate removal of tough-to-remove extraneous solid material. A fluid delivery system 87 can, if desired, also be provided on the parts delivery system to spray a conventional wetting agent onto the parts to assist in the release of any extraneous material that may be stuck to the parts. Any excess wetting agent would, of course, along with the extraneous material, drain from the parts delivery system 71 through the foraminous bottom wall 74 and drain pipe 77.

As parts are delivered to the parts delivery structure 71, motion is to be imparted thereto when the shaft 33 is rotated. Such oscillatory vibration motion is imparted by the provision of the weight support bracket 38 and the addition of individual weight members on the bracket. Addition of the additional weights can be accomplished through an access opening 81 in the wall construction 14 of the base frame 11. In addition, a sprocket-like member 82 can be fixedly mounted on the upper end of the shaft 33 as illustrated in FIG. 3. The sprocket includes a further weight support bracket supported for relative movement with respect to the shaft 33 but fixed in selected positions with respect to the sprocket 82 by means of a vertically extending pin 84 received between a pair of mutually adjacent teeth on the sprocket 82. As with the bracket 38, individual weights 86 can be piled one on top of the other on the bracket 83 until the desired oscillatory vibration characteristic is achieved as the shaft 33 is rotated.

OPERATION

Although the operation of the device described above will be understood from the foregoing description by skilled persons, a summary of such description is now given for convenience.

The desired oscillatory vibration of the basin and track section 12 is achieved by selecting the desired number of weights 86 which are to be piled onto the bracket 83 through the upwardly open end of the upstanding cylinder member 27. It has been found that the weights 86 on the bracket 83 are generally sufficient to achieve the desired oscillatory vibration. However, if additional characteristics are required in order to effect and acceptable movement of the parts being introduced into the device, additional weights can be added to the bracket 38 through the access opening 81 in the base frame 11. After the aforesaid oscillatory vibration characteristic has been achieved, parts can be introduced into the parts delivery structure 71 and allowed to pass over the foraminous wall 74 to facilitate removal of extraneous solid matter and fluid that might be present on the parts. This extraneous solid matter and fluid is allowed to drain out of the chamber below the foraminous wall 74 though the drain pipe 77.

With the gate 49 in the position 53 illustrated in FIG. 5, parts are allowed to move in a generally counterclockwise direction (assuming the oscillatory vibration characteristic has been appropriately set), through the passageway or opening 41 into the annular basin 26. The parts will continue to move in a generally counterclockwise manner in the basin 26 confined by the inner wall defined by the upstanding cylinder member 27 and the outer wall defined by the upstanding cylinder member 39. After all of the parts have been introduced into the system, the gate can be move to the solid line position illustrated in FIG. 5. The parts can be allowed to remain still in the annular basin or allowed to move in a circular path in the annular basin for any desired period of time sufficient to allow the treating solution within the annular basin to surface treat the parts.

Exemplary treatment solutions are:
A. Hot alkaline cleaner for oil removal.
B. Warm emulsion accelerator for metal surfaces prior to phosphating.
C. Warm iron phosphate solution for cleaning and phosphating.

After the surface of the parts has been appropriately treated by the treatment solution in the annular basin 27, the gate can be moved to the position illustrated at 52 in FIG. 5 and, with the basin and track section 12 being driven for oscillatory vibration, the parts are allowed to move out of the annular basin 27 into the space between the upstanding cylinder member 39 and the upstanding cylinder member 42 and into the inlet portion 47 of the track 46. The parts will continue to move up the inclined track 46 out of the first treatment solution to and beyond the first foraminous bottom wall section 62 of a first treating station 61A whereat a second treatment solution is introduced through the fluid delivery pipe 66 and spray head 67 so that the second treatment solution will be sprayed onto the parts as they move thereunder. Excess second treatment solution will be allowed to trickle or flow down the inclined track to and pass through the foraminous bottom wall 62 into the chamber 63 located therebelow and allowed to drain out of the chamber through the drain pipe 64 into a collection container not illustrated. The spray area covered by the spray from the spray head 67 can, in each instance, be adjusted to subject the parts passing therebeneath to the requisite exposure time to the treatment solution. In some instances, it may be desirable to add an additional fluid delivery system 66, 67 up the incline from the first one as shown in broken lines in FIG. 2.

As the parts continue to move up the inclined track past the first treating station 61A, the parts again will move over and beyond a further foraminous bottom wall 62 of a second treating station 61B and beneath a second fluid delivery system 66, 67 to allow a third treatment solution to be sprayed onto the parts as they move thereunder. As with the previous treating station 61A, excess treating solution will be allowed to trickle or flow down the inclined track to and pass through the foraminous bottom wall 62 of the second treating station 61B into the chamber 63 therebeneath and out through a drain pipe 64 into a collection container not illustrated. Thereafter, the parts can continue to move toward the outlet end 56 of the track 46. Additional or fewer numbers of treating stations can be provided, if desired.

The second treatment solution will almost always be a water rinse for removal of the first treatment solution from the part surfaces. However, a set of second treatment solutions, coordinated with those mentioned for the first treatment solution, are, but not limited to:

A. Acid pickling solution for scale or tarnish removal.
B. Warm manganese phosphate coating solution.
C. Warm, dilute iron phosphate solution for prephosphating.

Similarly, third treatment solutions in coordination with those above are, but not limited to:

A. Film forming solution for removal of pickling solution and assisting drying process.
B. Lubricating oil for impregnating manganese phosphate coating.
C. Acidic chromate sealer.

A treatment in any given sequence generally will have a water rinse after the treatment, sometimes even in the case of the third treatment.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A device for surface treating of metal parts, comprising:
   a base frame;
   an annular basin having a bottom wall, an inner upstanding cylindrical wall and an outer upstanding cylindrical wall spaced radially outwardly from and concentric to said inner wall, said inner and outer cylindrical walls being sealingly connected to said bottom wall to facilitate holding a first treatment solution therein;
   an upwardly inclined track secured to and encircling said annular basin in a direction from a lower end of said track terminating at a level flush with said bottom wall and defining an inlet end thereat to an upper end of said track defining an outlet end thereat;
   resilient means interposed between and connected to each of said annular basin and said base frame so that said annular basin and said upwardly inclined track are resiliently supported on said base frame and adapted to move relative to said base frame;
   means defining a passageway through said outer cylindrical wall and communicating with said inlet end of said track;
   movable gate means for opening and closing said passageway;
   means defining at least one treatment station along the length of said upwardly inclined track between said inlet end and said outlet end, said station having a foraminous bottom wall and a fluid delivery means for spraying a second treatment solution toward said foraminous bottom wall;
   treatment solution collecting means located beneath said foraminous bottom wall for collecting the second treatment solution passing through the foraminous bottom wall;
   a shaft and support means for supporting said shaft for rotation about an axis that is congruent with a central axis of said annular basin;
   weight means mounted on said shaft for imparting an oscillatory vibration to said annular basin and said track in response to a rotatable driving of said shaft;
   a parts delivery means adapted to supply parts to said annular basin; and
   drive means for rotatably driving said shaft.

2. The device according to claim 1, wherein said movable gate means is a blade pivotally supported on a hinge, said hinge being oriented on said outer cylindrical wall, said blade being movable between said closed position where said blade totally blocks said passageway and an open position where said blade blocks the path of movement of the parts in said annular basin and diverts the parts out of said annular basin through said passageway.

3. The device according to claim 2, wherein said parts delivery means includes an inlet chute secured to an outside wall of said annular basin, said chute having an inlet end and an outlet end and a segment therebetween with a further foraminous bottom wall, said outlet end communicating with said annular basin when said blade is in a still further position blocking said inlet end to said track and while simultaneously diverting parts into said annular basin.

4. The device according to claim 3, wherein said hinge is oriented adjacent said inlet end to said track.

5. The device according to claim 1, wherein plural treatment stations are provided along the length of said track, each having a foraminous bottom wall and a fluid delivery means for spraying additional respective treatment solutions toward a respective foraminous bottom wall, and wherein a further collecting means is provided at each station for collecting the respective treatment solution passing through the respective foraminous bottom wall.

6. The device according to claim 1, wherein said resilient means includes plural arcuately spaced coiled springs.

7. The device according to claim 1, wherein a bottom wall of said track has an arcuate cross section.

8. The device according to claim 1, wherein said motor is mounted on said base frame, and wherein a drive coupling means is provided for facilitating a driving connection between said motor and said shaft while simultaneously permitting a relative movement to occur therebetween.

9. The device according to claim 1, wherein a further fluid delivery means is provided in association with said parts delivery means for spraying a further treatment solution onto the parts for purposes of further facilitating removal of extraneous material from the parts prior to their entry into said annular basin.

* * * * *